July 15, 1969     SVEN-TORSTEN STORK     3,455,346

FUEL SUPPLY APPARATUS

Filed June 23, 1966     2 Sheets-Sheet 1

INVENTOR.
Sven Torsten Stork
BY
ATTORNEY

# United States Patent Office 3,455,346
Patented July 15, 1969

3,455,346
FUEL SUPPLY APPARATUS
Sven-Torsten Stork, Ektorp, Sweden, assignor to Atlas Copco Aktiebolag, Nacka, Sweden, a corporation of Sweden
Filed June 23, 1966, Ser. No. 564,475
Int. Cl. B65b *31/02, 1/30, 57/06*
U.S. Cl. 141—42           3 Claims

ABSTRACT OF THE DISCLOSURE

A motor-driven compressor having a fuel tank and a compressed air-driven pump means supplied by the compressor for drawing fuel into the tank.

---

Figure 1:
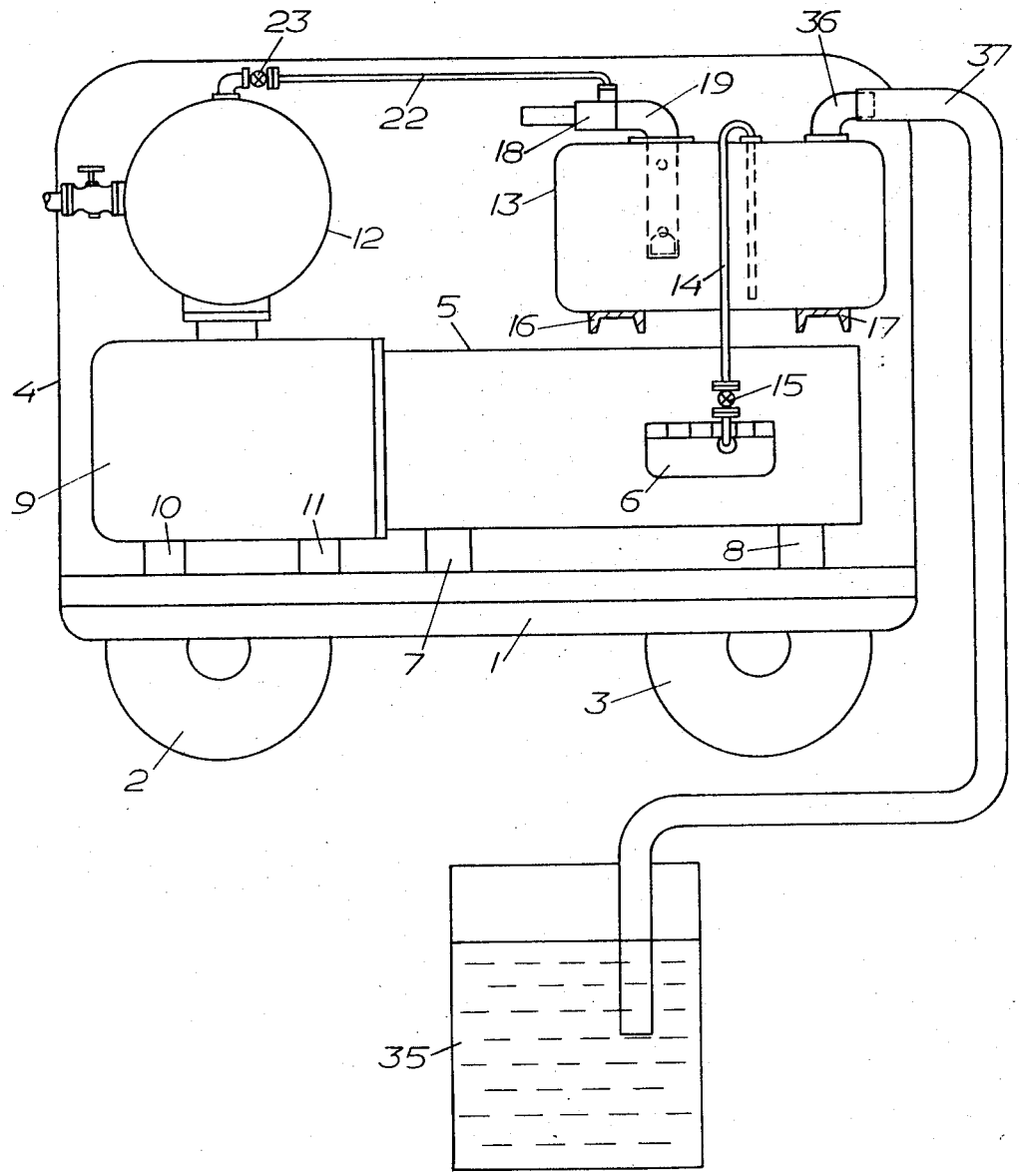
Figure 2:
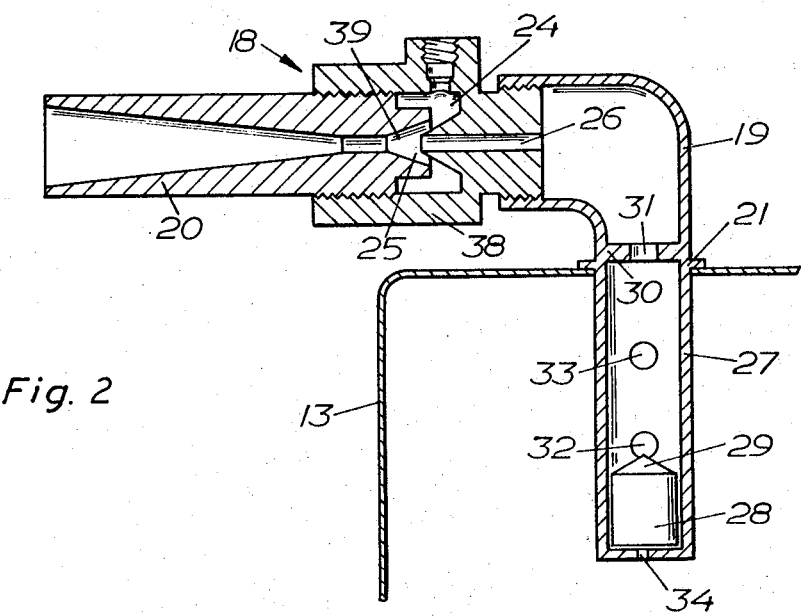
Figure 3:
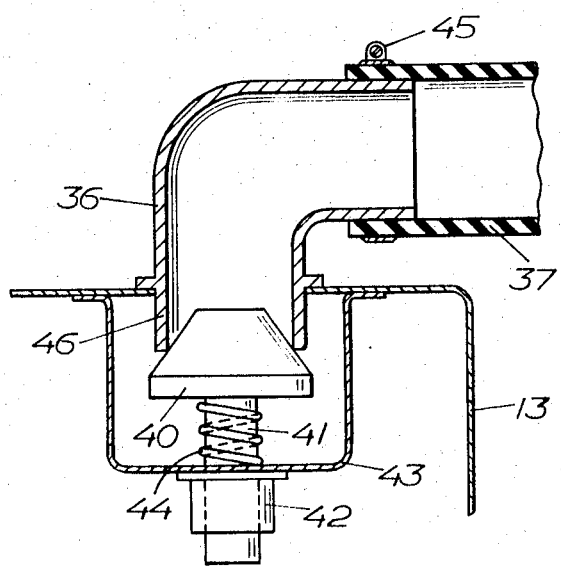

This invention relates to improvements in fuel supply apparatus for combustion motor driven machines such as engine driven compressors, engine driven pumps or generators or other machinery. In portable and other motor driven machinery refueling of the machine often takes considerable time and is combined with considerable effort when large quantities of fuel have to be filled into the fuel tank of the machine. It is often desired to fill the fuel tank of a machine from an oil barrel and if this is carried out with the aid of a manually operated pump such pumping takes considerable time and effort. In order to facilitate refueling of various motor driven machines I supply a fuel supply apparatus comprising a liquid fuel tank capable of resisting a certain external pressure, liquid conduit means connecting said tank to a motor, power operated pump means having a suction conduit in flow communication with said tank for lowering the air pressure in the tank to a value not exceeding said external pressure, means for bringing the tank in flow communication with the atmosphere, when said pump means is inoperative, and means for connecting the interior of the tank with a liquid fuel source under atmospheric pressure. In the accompanying drawings one embodiment of a fuel supply apparatus according to the invention is illustrated by way of example, as applied to a motor compressor. FIG. 1 is a diagrammatic side view and section of a motor compressor unit in which the fuel tank is being filled from an oil barrel. FIG. 2 is a partial section of a portion of the fuel tank of the motor compressor in FIG. 1 together with a pump on a larger scale. FIG. 3 is a vertical section through the fuel inlet portion to the fuel tank in the motor compressor of FIG. 1 also on a larger scale.

In the drawings 1 designates the frame of a motor compressor unit which is movable on wheels 2, 3 and provided with a canopy 4. A combustion motor such as a diesel engine 5 having a fuel injection pump 6 is carried on support members 7, 8 supported by the frame 1. A compressor 9 driven by the motor 5 is flanged or connected to the motors in any suitable way and carried by supporting cross members 10 and 11 resting on the frame 1. The compressor 9 delivers compressed air to a receiver 12 and a compressed air network. 13 indicates a fuel tank which by means of a conduit 14 and a shut-off valve 15 is connected to the fuel injection pump 6 of the motor 5. The fuel tank 13 is carried by cross members 16 and 17 supported by the frame 1.

The fuel tank 13 is constructed from sheet material in such a way that it is capable of resisting a certain external pressure, for instance one half kilogramme per square cm. On top of the fuel tank is provided a power operated pump means which in the present case consists of a compressed air driven ejector 18 provided with a suction conduit 19 which connects the ejector to the interior of the fuel tank 13. The ejector and its connection to the tank is illustrated in detail in FIG. 2 on a larger scale. In FIG. 2, 38 designates the ejector housing which is provided with a venturi shaped discharge conduit 20 and is connected to the suction conduit 19 which is flanged to the fuel tank 13 at 21. A compressed air conduit 22 provided with a suitable shut-off valve 23 is provided for supplying compressed air from the air receiver 12 to an annular chamber 24 in the ejector housing 38, which through an annular passage 25 communicates with the inlet end 39 of the venturi tube 20. The venturi tube communicates with the suction conduit 19 through a suction passage 26.

The suction conduit 19 extends into the fuel tank 13 with a portion forming a guide tube 27 for a float valve member 28 which is movable in the guide tube 27 and has a conical upper end 29 for cooperation with a valve seat 30 provided with a central opening 31 in the upper end of the guide tube. The guide tube has a number of fairly large ports 32, 33 which form communication between the interior of the guide tube and the interior of the fuel tank 13. Furthermore a small opening 34 is provided in the bottom of the guide tube to prevent the valve 28 from sticking to the bottom of the tube 27. The valve 28 is movable in the guide tube 27 with considerable clearance and is made of a material which is floatable in the fuel intended for the apparatus.

FIG. 3 illustrates in detail the connection between the fuel tank 13 and an oil barrel 35. For this purpose an elbow conduit 36 is fitted to the upper portion of the fuel tank and communicates with the interior of the fuel tank. Said elbow conduit 36 carries a suitable fuel hose 37 which may be secured to the elbow conduit 36 by means of a clip 45 or a suitable coupling. The elbow conduit 36 has a throat portion 46 which projects into the fuel tank 13 and cooperates with a conical check valve member 40 provided on a stem 41 guided in a bushing 42 carried by a bracket or valve cage 43. A spring 44 urges the valve member 40 to closing position in the throat 46.

In operation, when it is desired to refuel the illustrated motor compressor, the hose 37 is inserted into a fuel oil barrel 35 preferably leaving a small distance between the end of the hose 37 and the bottom of the barrel to avoid sucking up condensation water that may have collected at the bottom of the barrel. Compressed air is then turned on the ejector 18 by opening the valve 23 creating suction in the suction conduit 19 and consequently also in the fuel tank 13. Fuel oil is then drawn from the oil barrel 35 through the hose 37 into the tank 13 and when the fuel level in the tank reaches the float valve member 28 said valve member is raised and as the fuel level rises, the valve member 28 moves upward in the guide tube 27 and finally closes the opening 31. Over-filling of the fuel tank is hereby prevented. When the fuel tank has been filled in this manner, the compressed air through the pipe 22 is turned off. The valve 40 closes the throat 46 and the hose 37 may be removed from the oil barrel 35. The valve 40 prevents fuel oil from flowing out through the conduit 36 and the hose 37 when the motor compressor unit is moved over rough terrain or if it is left standing in an inclined position. When the motor 5 is operated and fuel is drawn from the fuel tank through the conduit 14, air from the atmosphere may enter the fuel tank through the passage 26 in the ejector and further through the ports 33 so that undesirable vacuum in the fuel tank is avoided.

The invention above described and illustrated in the drawings should only be considered as an example and may be modified in several different ways within the scope of the claims. The ejector pump 18 may, for instance, be replaced by some other kind of pump capable of producing the necessary vacuum or pressure below atmospheric in the fuel tank 13, but if a positive displacement pump is used, an extra valve or opening has to be provided or the valve 40 has to be constructed in a way which prevents the fuel tank from collapsing due to suction from the fuel pump 6.

What I claim is:

1. A fuel supply apparatus for a combustion motor-driven compressor comprising, a liquid fuel tank capable of resisting a certain external pressure, liquid conduit means connecting said tank to a combustion motor, a compressor driven by said combustion motor and having a discharge conduit, a compressed air-driven pump having a compressed air supply line communicable with the compressor discharge conduit, and a suction conduit in flow communication with the interior of said tank for lowering the air pressure in the tank to a value at which said external pressure is not exceeded, means for bringing the tank into flow communication with the atmosphere when said pump is inoperative, and means for connecting the interior of the tank with a liquid fuel source under atmospheric pressure.

2. An apparatus according to claim 1, in which the compressed air-driven pump is a compressed air-driven ejector having a suction conduit in flow communication with the interior of the fuel tank above the highest permissible fuel level in the tank.

3. An apparatus according to claim 1, in which a check valve is provided in the means for connecting the tank with the liquid fuel source, said check valve being arranged to prevent the escape of fuel from the tank through said connecting means, and a spring arranged to give said valve a light bias in closing direction.

References Cited
UNITED STATES PATENTS

| | | | |
|---|---|---|---|
| 2,227,611 | 1/1941 | Walleser | 141—42 |
| 2,771,917 | 11/1956 | Cannell | 141—303 X |
| 3,280,858 | 10/1966 | Paulson | 141—302 X |

HOUSTON S. BELL, Jr., Primary Examiner

U.S. Cl. X.R.

137—151, 391, 433; 141—46, 59, 229, 303